US007466748B2

(12) United States Patent
Rauer et al.

(10) Patent No.: US 7,466,748 B2
(45) Date of Patent: Dec. 16, 2008

(54) ELECTRONIC MEASURING DEVICE FOR DETECTING A PROCESS VARIABLE, IN PARTICULAR A RADAR OR ULTRASONIC FILLING LEVEL MEASURING DEVICE, AND A METHOD FOR OPERATING A MEASURING DEVICE OF THIS TYPE

(75) Inventors: Winfried Rauer, Fischerbach (DE); Christian Ruf, Offenburg (DE)

(73) Assignee: VEGA Grieshaber, Wolfach (DE)

( * ) Notice: Subject to any disclaimer, the term of this patent is extended or adjusted under 35 U.S.C. 154(b) by 0 days.

(21) Appl. No.: 11/580,349

(22) Filed: Oct. 13, 2006

(65) Prior Publication Data

US 2007/0071082 A1 Mar. 29, 2007

Related U.S. Application Data

(63) Continuation of application No. 09/998,000, filed on Nov. 29, 2001, now abandoned.

(60) Provisional application No. 60/274,712, filed on Mar. 12, 2001.

(30) Foreign Application Priority Data

Jan. 12, 2000 (DE) ................................ 100 59 815

(51) Int. Cl.
*H04B 3/46* (2006.01)
*H04B 17/00* (2006.01)
*H04Q 1/20* (2006.01)

(52) U.S. Cl. ........................ 375/224; 375/228; 324/637; 324/76.14; 324/76.56; 340/943; 340/45.3

(58) Field of Classification Search ................. 375/224, 375/228; 324/637, 76.14, 76.56; 340/943, 340/545.3; 701/17
See application file for complete search history.

(56) References Cited

U.S. PATENT DOCUMENTS 4,737,787 A 4/1988 Ito et al.

(Continued)

FOREIGN PATENT DOCUMENTS

EP 0319820 A1 6/1989

(Continued)

*Primary Examiner*—Ted Wang
(74) *Attorney, Agent, or Firm*—Schwegman, Lundberg & Woessner, P.A.

(57) ABSTRACT

The invention related to a method and an electronic measuring device for detecting a process variable connectable to a two-wire line (101) for providing the supply energy and for digital communication with a process control, and a method for operating such a measuring device. An inventive measuring device includes a sensor means (114, 115, 123, 124; 314, 315, 323, 324) for measuring the process variable, a controlling device (117; 317) for controlling components of the measuring device, a voltage measuring device (116; 316) for measuring the supply voltage applied through the two-wire line (101), and a current control unit (122; 322) by means of which the current for supplying the measuring devices can be modified in a temporally appropriate manner as a function of the supply voltage measured by the voltage measuring device (116; 316).

29 Claims, 10 Drawing Sheets

U.S. PATENT DOCUMENTS

Figure 1:
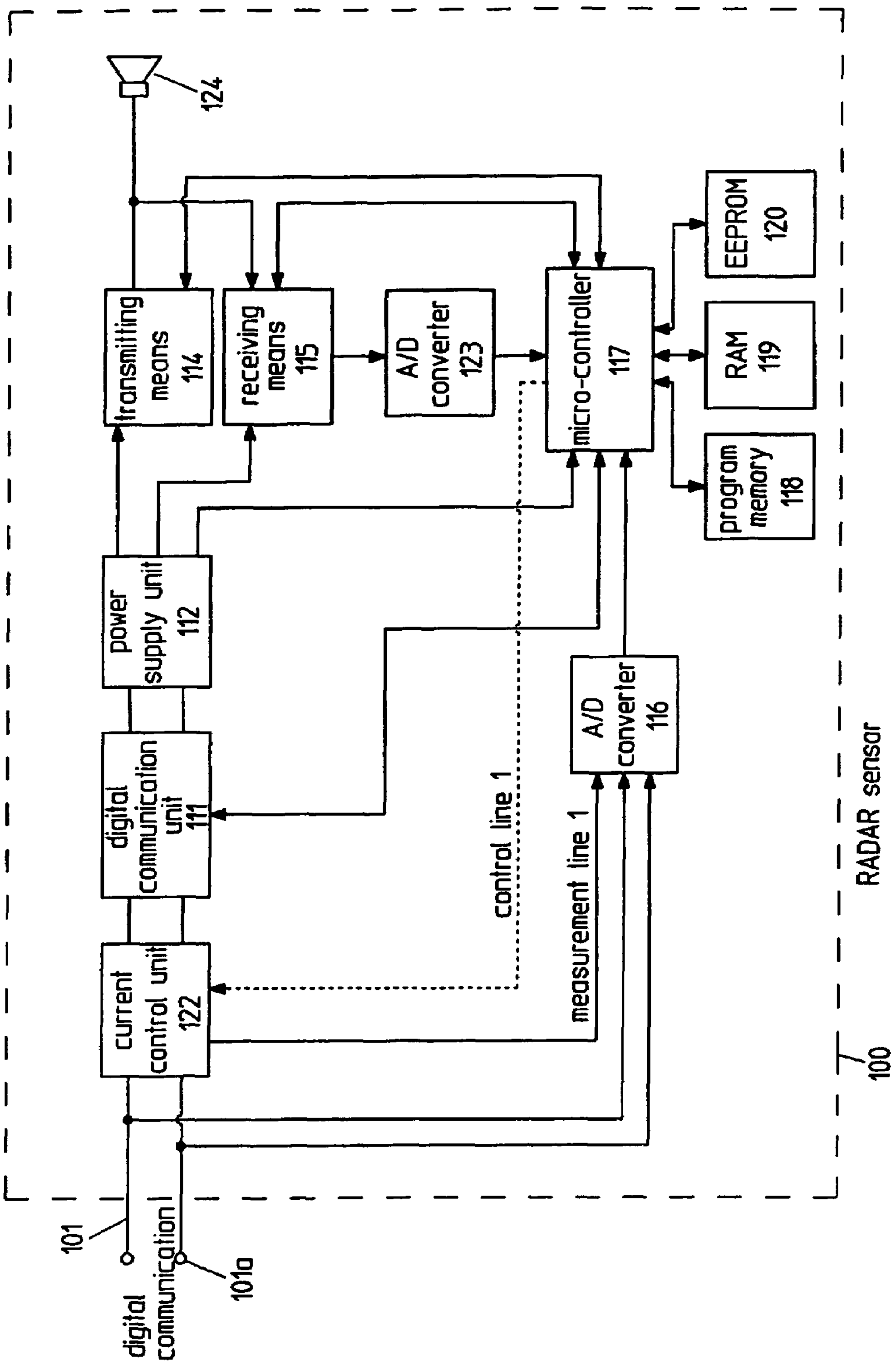

| | | | |
|---|---|---|---|
| 5,416,723 | A | 5/1995 | Zyl |
| 5,650,571 | A | 7/1997 | Freud et al. |
| 5,691,714 | A | 11/1997 | Mehnert |
| 5,760,309 | A | 6/1998 | Maltby et al. |
| 6,014,100 | A | 1/2000 | Fehrenbach et al. |
| 6,703,943 | B1 | 3/2004 | Lalla et al. |
| 2001/0016802 | A1 | 8/2001 | Florin |

FOREIGN PATENT DOCUMENTS

| | | | |
|---|---|---|---|
| EP | 0 522 244 | A2 | 1/1993 |
| EP | 0 895 209 | A1 | 2/1999 |
| EP | 0895209 | A1 | 2/1999 |
| EP | 0986039 | | 3/2000 |
| EP | 1174841 | A1 | 1/2002 |
| WO | WO-00/75904 | A1 | 12/2000 |

current development in the shunt arm of the current control unit (loss current)
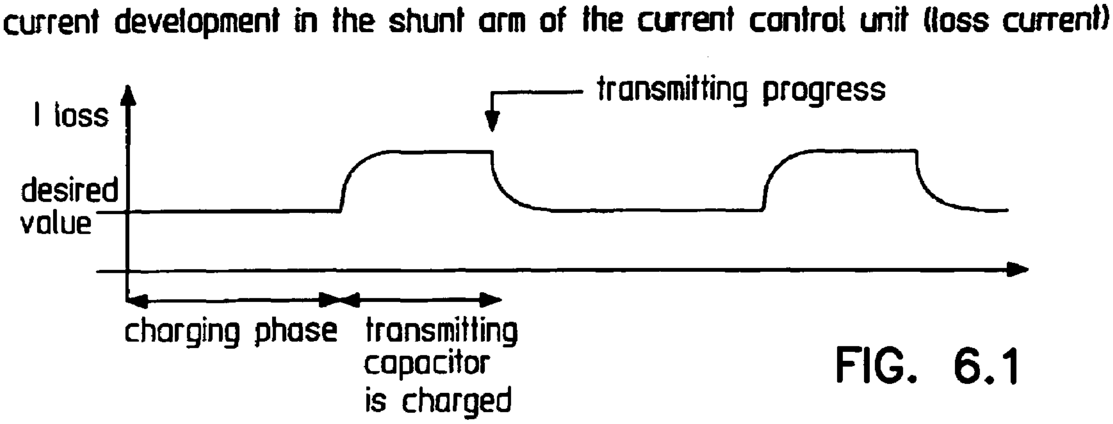
FIG. 6.1
voltage development at the transmitting capacitor
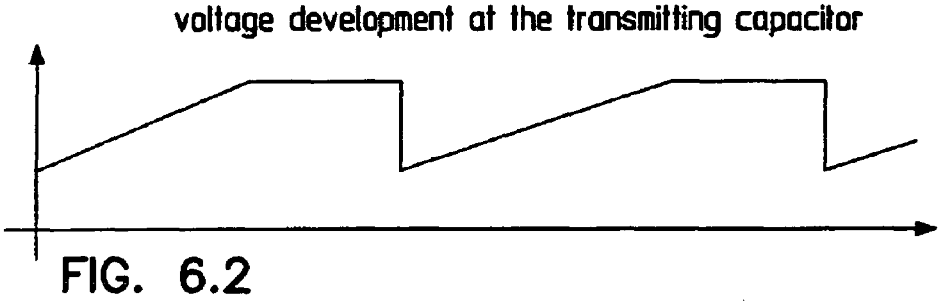
FIG. 6.2
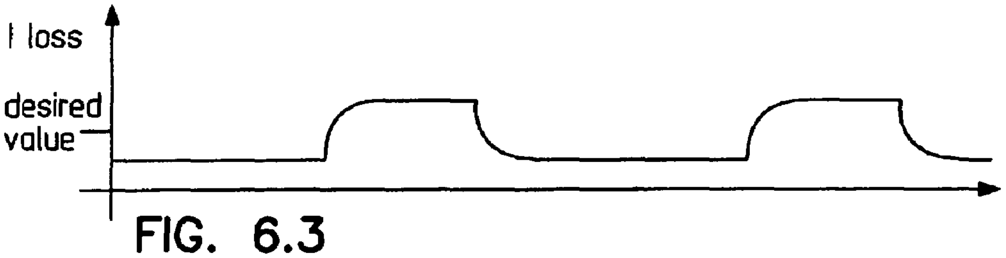
FIG. 6.3
voltage development at the transmitting capacitor
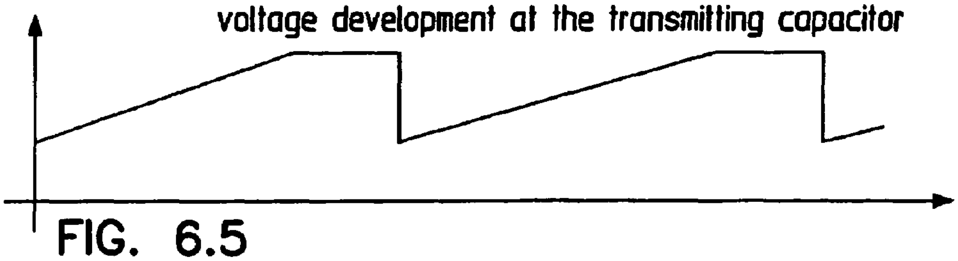
FIG. 6.5

ELECTRONIC MEASURING DEVICE FOR DETECTING A PROCESS VARIABLE, IN PARTICULAR A RADAR OR ULTRASONIC FILLING LEVEL MEASURING DEVICE, AND A METHOD FOR OPERATING A MEASURING DEVICE OF THIS TYPE

CROSS-REFERENCE TO RELATED APPLICATIONS

This application is a Continuation of U.S. application Ser. No. 09/998,000, filed on Nov. 29, 2001 now abandoned, which claims priority under 35 U.S.C. 119 from U.S. Provisional Application No. 60/274,712, filed Mar. 12, 2001, and from German Application No. 100 59 815.3, filed Jan. 12, 2000, which applications are incorporated herein by reference.

TECHNICAL FIELD

The present invention relates to an electronic measuring device for detecting a process variable connectable to a two-wire line, for which purpose a two-wire terminal is present in particular. Through said two-wire line the supply energy and the digital communication is made available by means of a process control system. Such measuring devices usually present a sensor means for measuring the process variable, and a control means for controlling components of the sensor means. It is to be noted that the term sensor means here includes in the widest sense all components participating in the generation and processing of signals, as well as all associated peripheral equipment.

PRIOR ART

Such electronic measuring devices connected exclusively through a two-wire line, are in general well known in prior art, and are, for example used as a radar or ultrasonic filling level measuring device. An ultrasonic filling level measuring device emits sound waves by means of a sensor device in the form of an ultrasonic sensor towards a surface of a filling product present in a receptacle. After reception of the signal portion reflected by the filling product surface, the filling level within the receptacle can be calculated through an evaluation of the signal transit time. A controlling means within the measuring device thereby co-ordinates the interaction of all participating circuit parts and measuring device components, respectively. In a radar filling level measuring device, radar pulses are generated and emitted instead of ultrasonic wave pulses.

In a measuring device of the mentioned type, a two-wire line, which is usually used on the hierarchy level of field bus systems, furnishes, for one, the supply energy required for operating the measuring device, and, apart from that, also serves the digital communication with an overriding process control system meant for the further processing of the measuring results delivered by the measuring device.

In practice, it has been shown that with a connection through a two-wire line, the energy input of the measuring device—insofar as no other measures are implemented—varies in a very strong manner. For one, the power input is constant during periods of measurement preparation or performance, for another, less power is taken from the two-wire line by the measuring device in the remaining time, a fact by which the power input and, consequently, the current consumption greatly decreases. These current fluctuations can interfere with the digital communication running on the same two-wire line. Rapid current fluctuations, in particular, i.e. current fluctuations taking place in a short space of time, have turned out to be disturbing.

In order to guarantee an undisturbed communication between the measuring device and the process control despite the double function of the two-wire line, it is hence necessary to keep the current consumption of the measuring device constant within determined limits, and to suppress, in particular, rapid current fluctuations. In time intervals of high power requirements arising, for example, during the performance of a measurement cycle, the measuring device will require a high current in order to meet the energy demand at a low supply voltage since the result of the power, as is generally known, is a product of voltage and current. If the current is now kept constant over the entire supply voltage range in order not to impair the digital communication by the energy supply, this measure will, however, lead to a multiplication of the power input at high supply voltages, entailing an unnecessarily high energy consumption and a strong heat development.

For this reason, measuring devices of the above-described kind were hitherto rather realized in multiple-wire technology. In this alternative likewise generally known in prior art, a line pair is provided for feeding the supply energy, whereas a second, separate line pair is meant for the digital communication. In said second line pair, the low constant current is allowed to flow as required for the reliable digital communication between the measuring device and the process control without the possibility of the energy supply causing any impairment to the communication. This solution, however, leads to a disadvantageous additional expenditure in the wiring for the measuring device.

REPRESENTATION OF THE INVENTION

It is therefore the technical problem on which the present invention is based to further improve an electronic measuring device in the two-wire technology in order to make possible a reliable digital communication at a minimum power input. Moreover, the invention is based on the further technical problem of providing a method for operating an electronic measuring device in the two-wire technology permitting a reliable digital communication.

These technical problems are solved by an electronic measuring device having the features of claim 1 or 4, and by a method having the features of claim 13 or 15, respectively.

The invention is based on the idea of controlling the current for the measuring device as a function of the measured input voltage for the first time, in such a manner that undesired, hence current fluctuations arising within a short space of time are prevented, and a current adaptation ensues within a space of time which is not detrimental to the communication. Current fluctuations disturbing the communication are, for example, then given when they are greater than 1 mA/ms. The advantage of the inventive solution resides in that current fluctuations disturbing the communication are allowed to be rapidly levelled. Thus, in a rapid power requirement change of the measuring device (e.g. a change from a transmitting operation to an evaluation operation and vice versa), the current flowing through the two-wire terminal will be kept constant, and this total current will be divided into a useful current and a loss current. The useful current here is the current portion used by the components of the measuring device for a perfect operation of the measuring device, and the loss current is the current portion which is not necessary for a perfect operation of the measuring device. If it is, for example, assessed that the power loss is too high—hence the loss current is too high—then the total current composed by the useful and the loss current can be reduced correspondingly, and namely in such a slow manner that no current fluctuations disturbing the communication will arise. Hereby, transient arising current fluctuations can be levelled, for one, so that substantially no interferences can be detected in the communication or are kept within acceptable limits, and, for another, the total power demand of the measuring device can be adapted to the instantaneous operational condition in appropriate spaces of time.

The measuring device attempts to minimize the power loss, i.e. the portion of the input power exceeding the power demand, and therewith to adapt the input power to the power demand. By means of controlling the spaces of time which are not detrimental to the communication, the power to be input can always be preset so that operation-contingent current fluctuations can be kept within acceptable limits.

An advantageous embodiment of the invention comprises a device for assessing the instantaneous power loss which is not necessary for maintaining the instantaneous operational condition of the measuring device. If this assessed power loss is too high as compared to a (memorized) reference value, then a corresponding new desired value can be sent to the current control unit through the controlling means, whereby the input current is slowly reduced, i.e. without causing the current fluctuations disturbing the communication at the two-wire line to occur. When a measuring device hence recognizes that the input power is too high because too much power loss is generated, this power demand excess can be minimized by reducing the power input to an extent that in the ideal case the input power is just sufficient for appropriately carrying out the measuring cycles. If more useful current is required in a new operational condition of the measuring device, then the desired current value will be slowly increased correspondingly.

According to an advantageous further development of the invention, the device is connected with a capacitor for determining an instantaneous power loss so as to measure the variation in time of the voltage at the capacitor and to therewith determine in an indirect manner whether a power loss has occurred. This configuration is in particular purposeful in an ultrasonic filling level measuring device, since there, the variation in voltage of a capacitor connected upstream of the ultrasonic transmitter is expressive with respect to a power loss.

As a further alternative for determining an instantaneous power loss, a device is suited by means of which the frequency of occurring sensor excitements can be determined without carrying out a measurement. The more often the sensor means is excited without a measurement being carried out, the higher is the power loss, and the current can be reduced correspondingly (slowly, substantially without current fluctuations disturbing the communication). In the event of the measuring device requiring less power for its defined task, the power loss can therewith be transformed in an efficient manner. Alternatively hereto, it is likewise possible to transform in a known manner the power loss into heat and to dissipate same to the outside.

It is likewise imaginable that the power loss is determined through a current sensing resistor or in any other suitable manner.

The measuring device can preferably be equipped with an A/D converter. Through the applied supply voltage, the input power can be calculated with a known current consumption. Should the supply voltage rise, the current will be reduced in such a manner that there does not ensue an excess in power demand. Should the supply voltage decrease, the current will be increased so that it is still possible to operate the measuring device.

An alternative solution provides for the power loss to be minimized in the current control unit. The corresponding electronic measuring device for detecting a process variable connectable to a two-wire line for providing the supply energy and the digital communication with a process control system, is equipped with a sensor means for measuring the process variable, a controlling means for controlling components of the sensor means, and a current control unit by means of which the current drawn through the two-wire line can be appropriately adjusted depending on the current drawn through the sensor means. With the adjustability of the current drawn through the two-wire line, a constant as possible current input can be guaranteed. In this variation, a measurement of the supply voltage is not necessary for achieving a current input without interfering fluctuations as compared to the above described solution.

Here, two controls are preferably present in the current control unit. One control provides for the total current remaining constant. The other control furnishes a desired current value for the first control and provides for the fact that a little current is flowing through a shunt arm at all times. This interleaved control hence provides for the total current being adapted to the sensor current, yet it is thereby ascertained that the loss current in the shunt arm is kept at a minimum.

SHORT DESCRIPTION OF THE DRAWINGS

Figure 2:
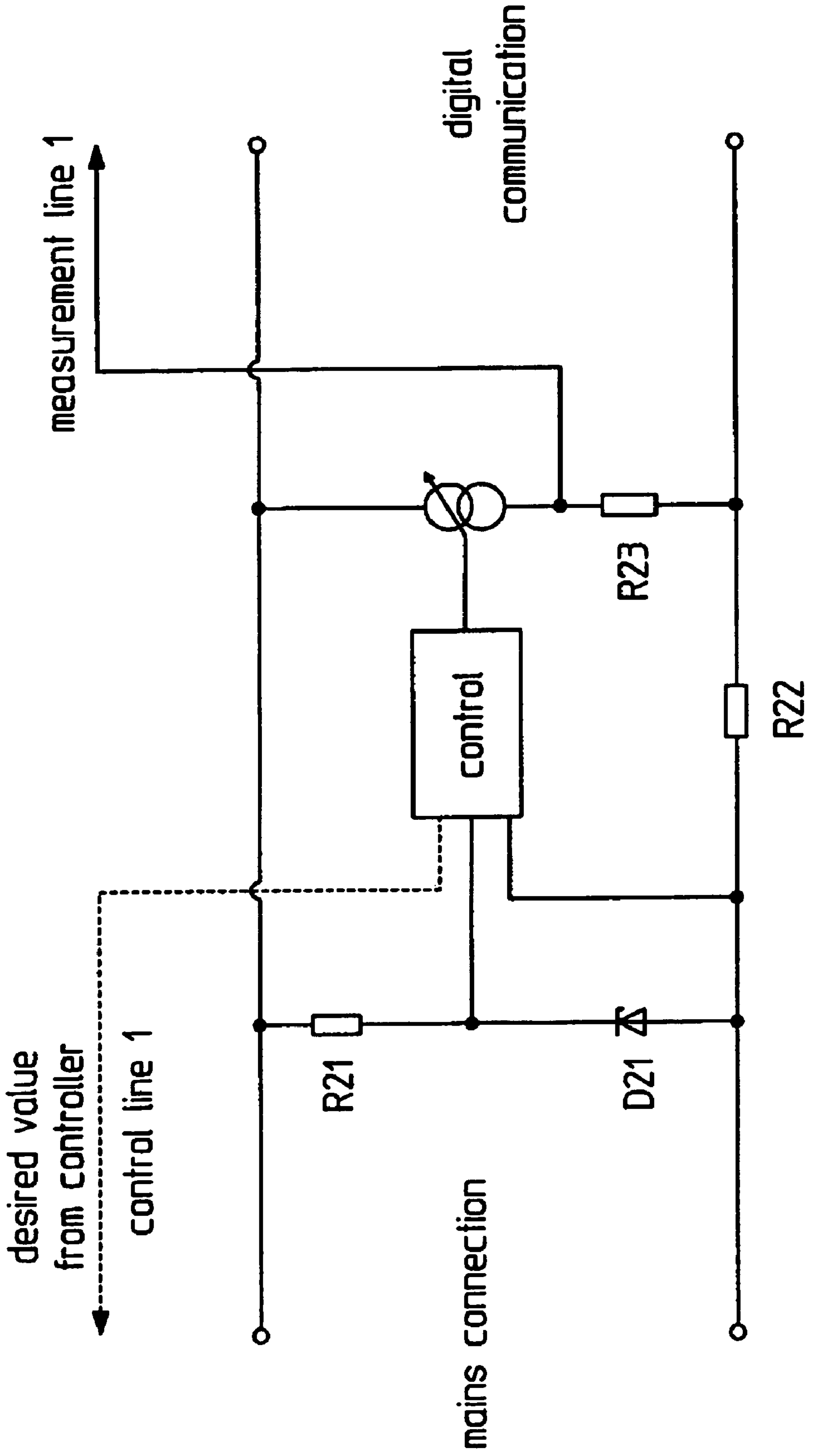
Figure 3:
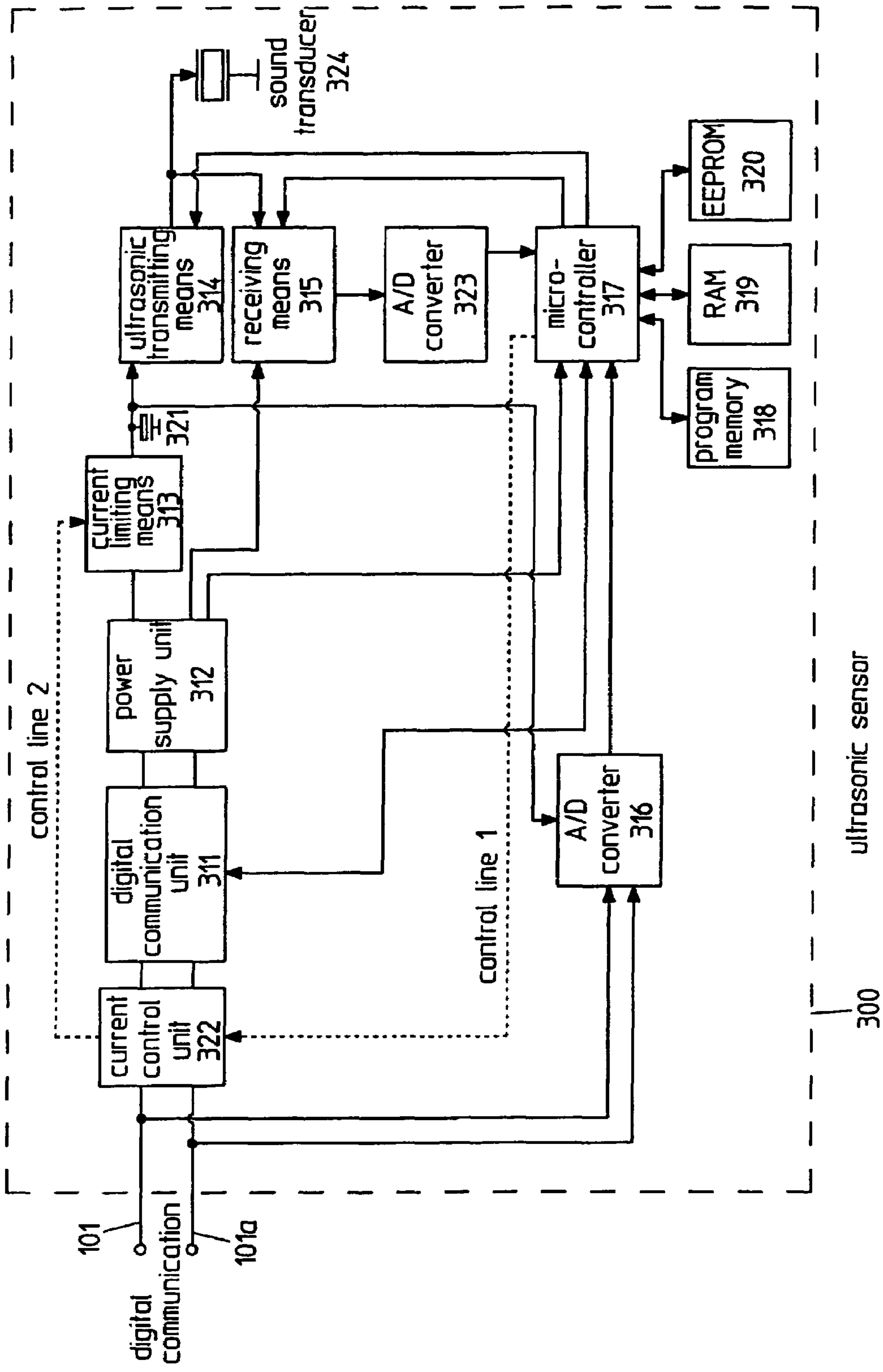
Figure 4:
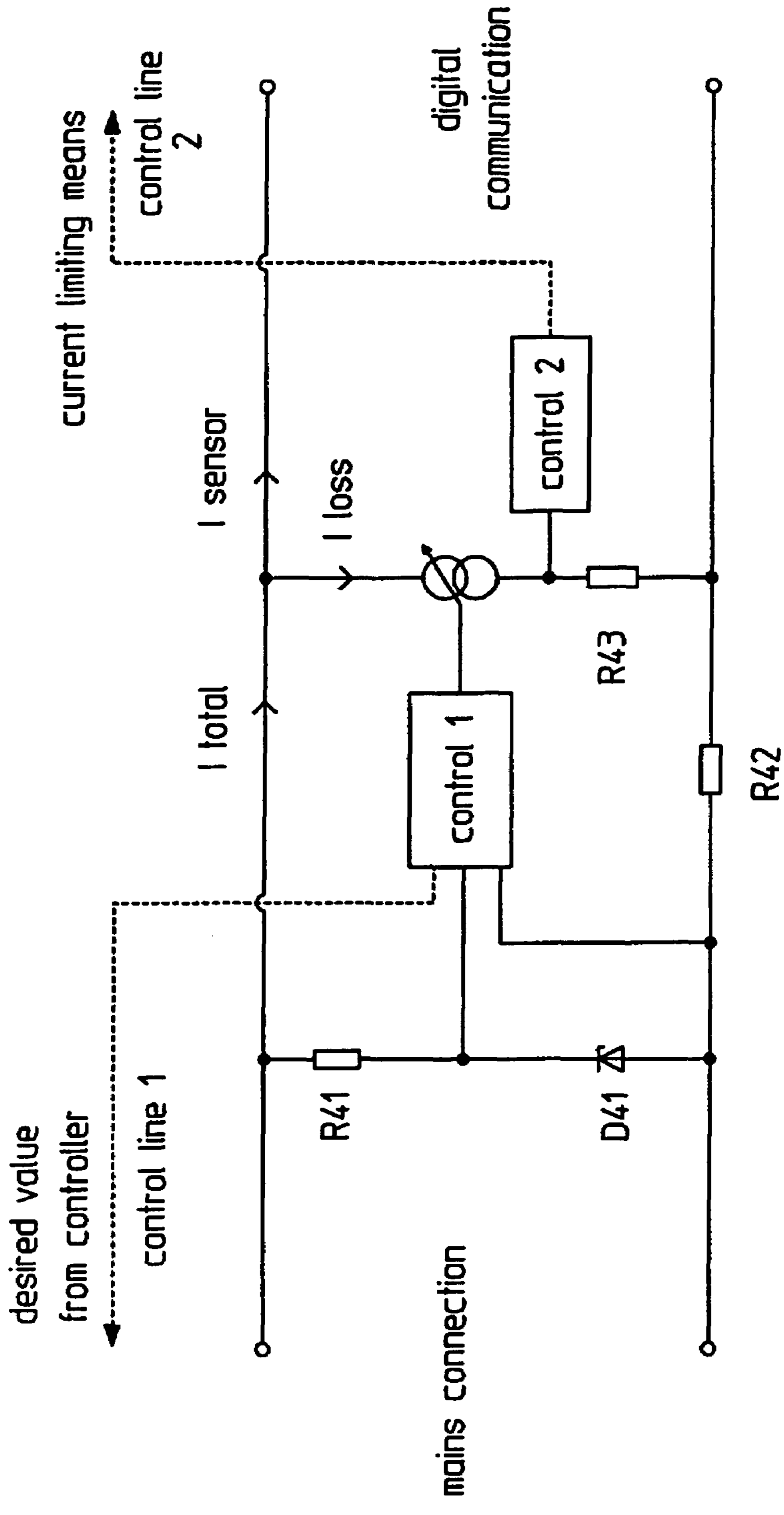
Figure 5:
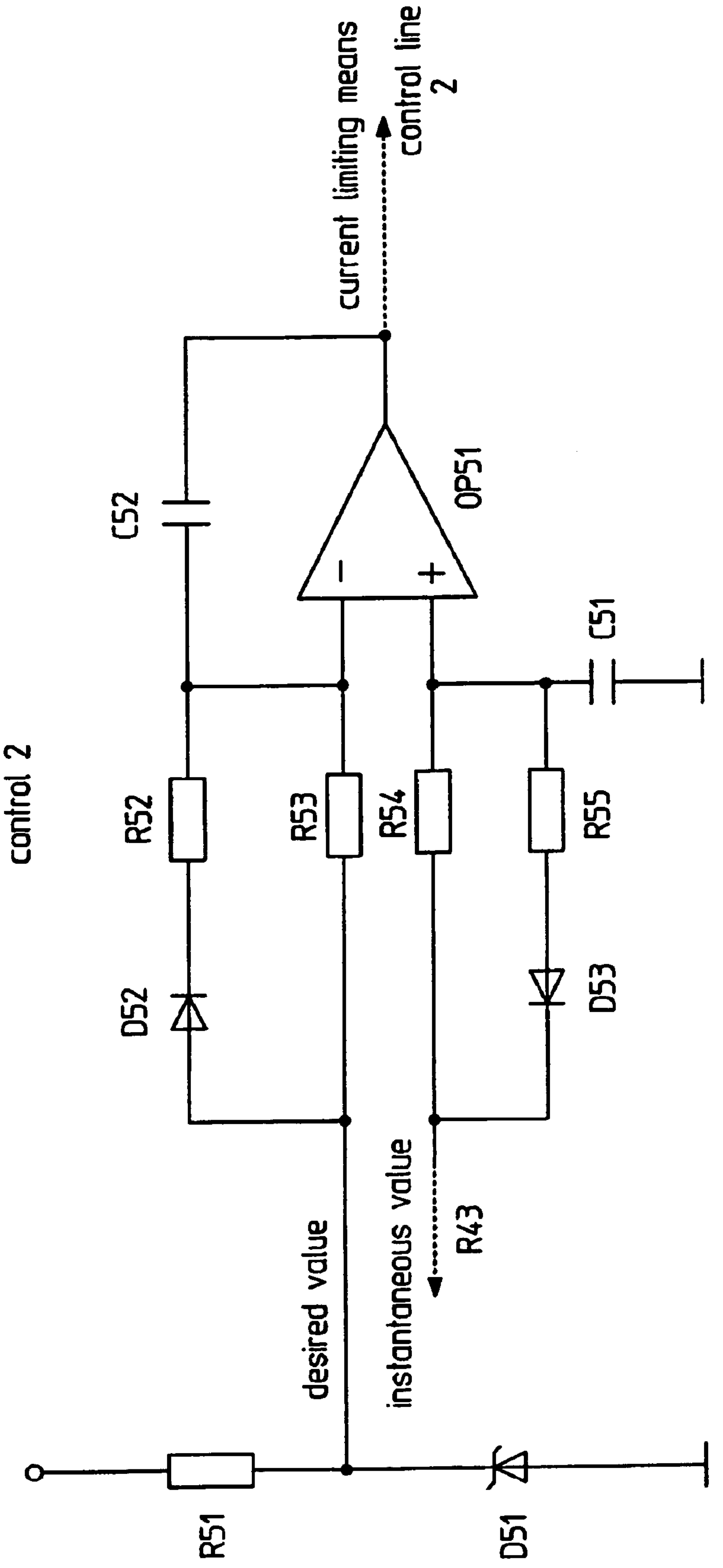
Figure 7:
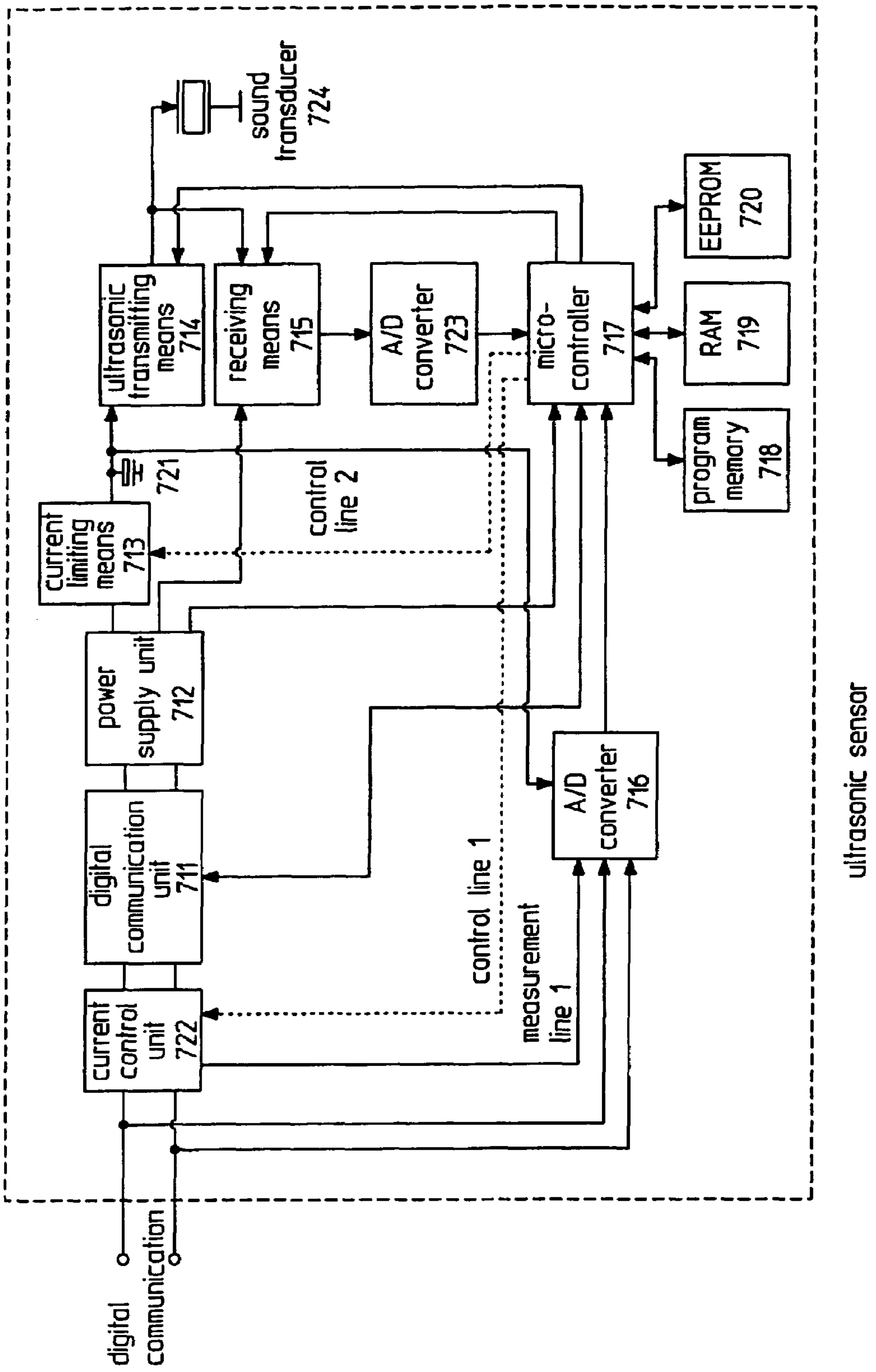
Figure 8:
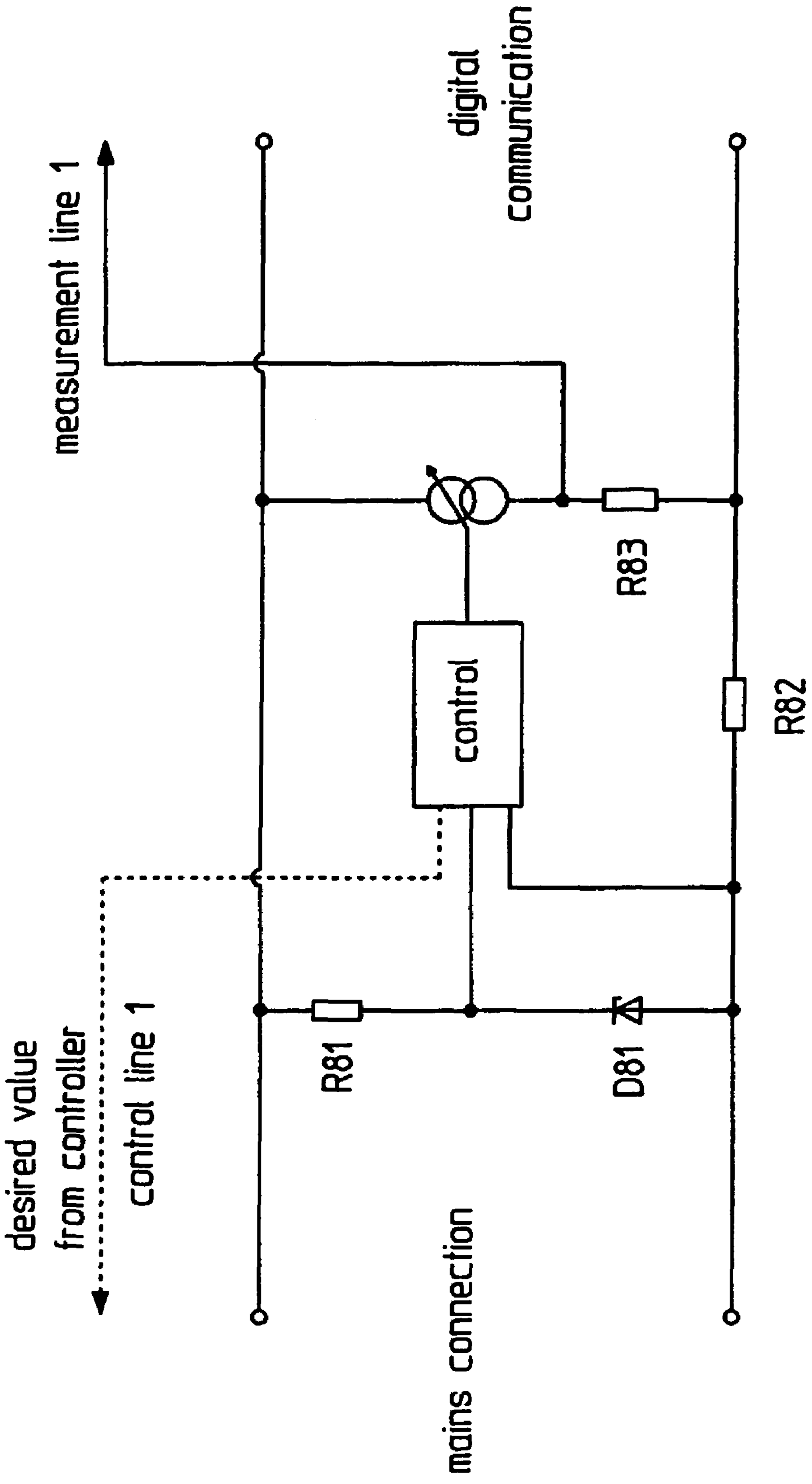
Figure 9:
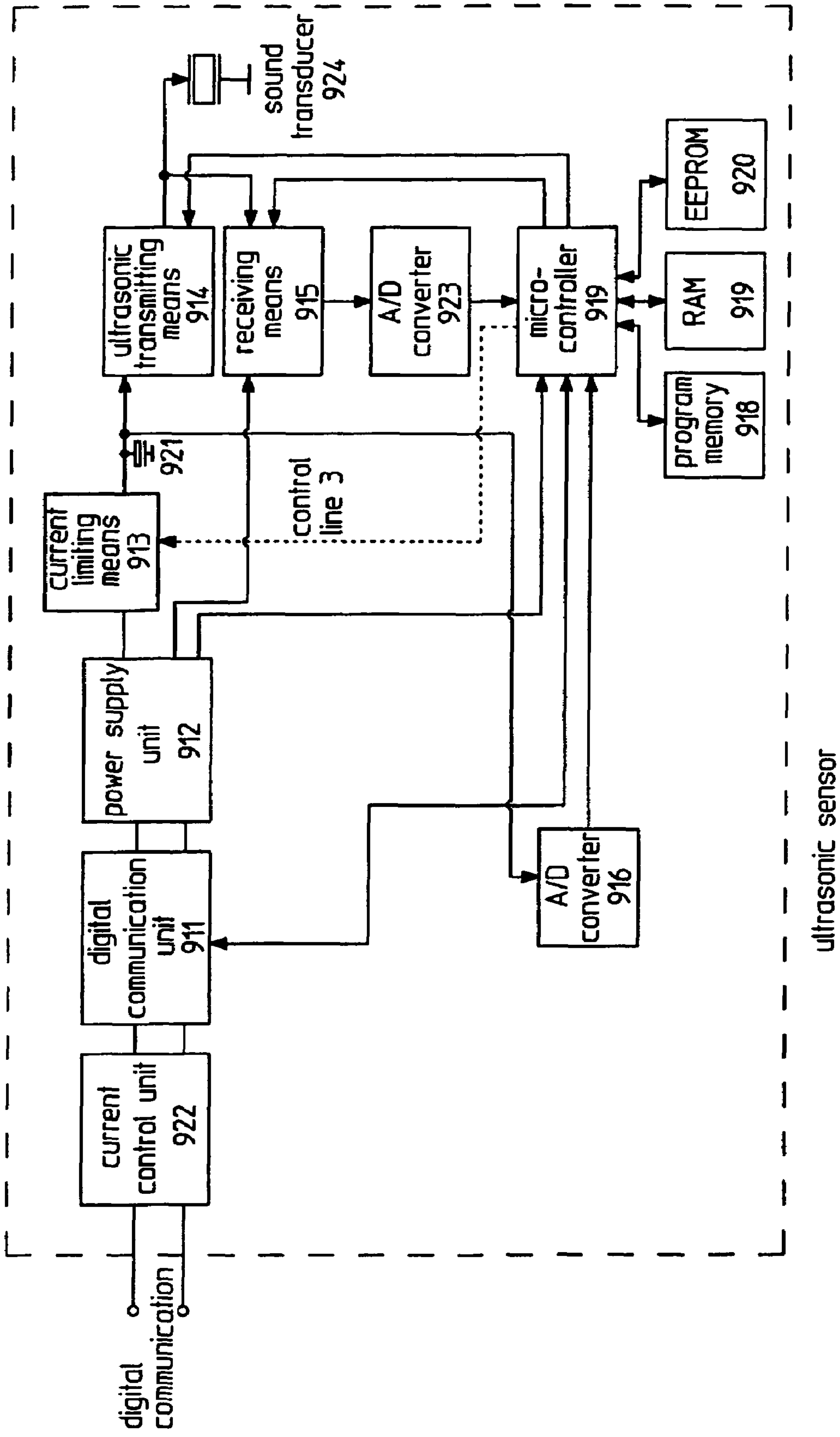
Figure 10:
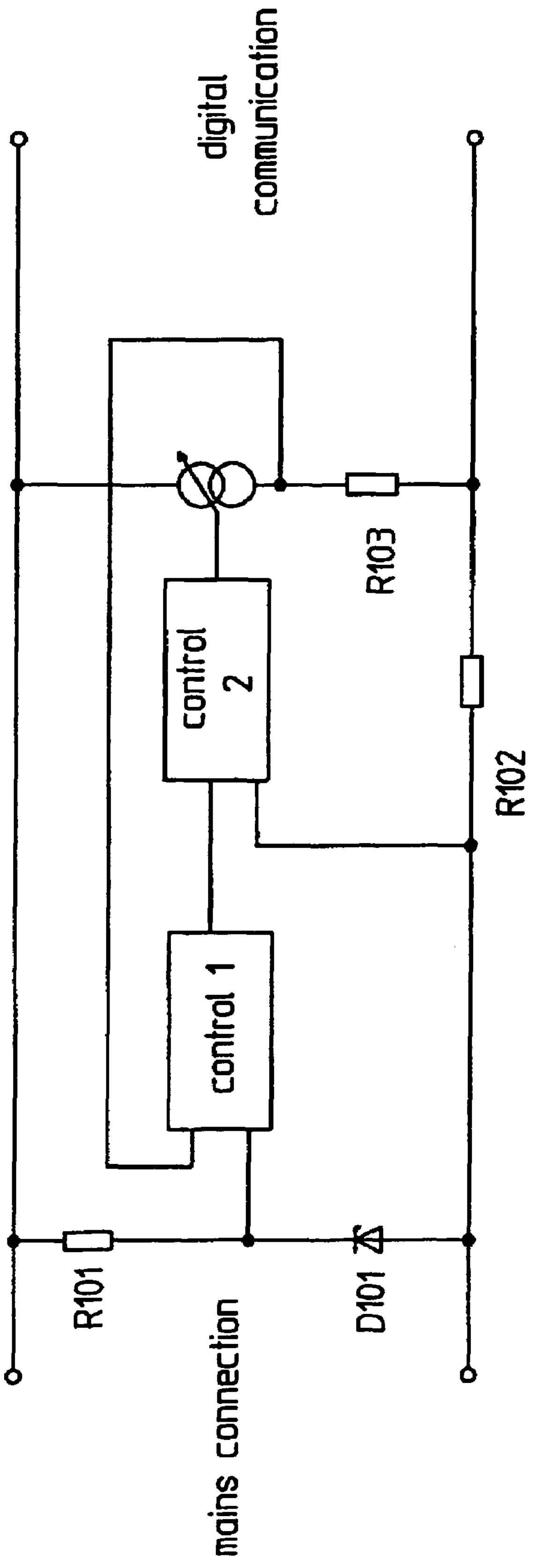

For a better understanding and further explanation, several embodiments of the invention are described in detail in the following with reference to the attached drawings. Therein shows:

FIG. 1 a block diagram representation of an inventive measuring device according to a first embodiment, FIG. 2 a detailed circuit arrangement of the current control unit of the embodiment as per FIG. 1, FIG. 3 a block diagram representation of an inventive measuring device according to a second embodiment, FIG. 4 a detailed circuit arrangement of the current control unit of the embodiment as per FIG. 3, FIG. 5 a detailed circuit arrangement of a charging current limitation in the embodiment as per FIG. 3, FIG. 6 a detailed circuit arrangement of the current control unit in the embodiment as per FIG. 5, FIG. 7 a block diagram representation of an inventive measuring device according to a further embodiment of the invention, and FIG. 8 a detailed circuit arrangement of the current control unit in the embodiment as per FIG. 7, FIG. 9 a block diagram representation of an inventive measuring device according to a further embodiment of the invention, and FIG. 10 a detailed circuit arrangement of the current control unit in the embodiment as per FIG. 9.

DESCRIPTION OF EMBODIMENTS OF THE INVENTION

The electronic measuring device 100 as per FIG. 1 serves the purpose of a filling level measurement according to the radar principle. Electronic measuring device 100 comprises a two-wire terminal 101*a* for being connected to a two-wire line 101 and via same to a field bus system. The communication as well as the energy supply both exclusively use two-wire line 101. A power supply unit 112 thereby gains the necessary supply voltage ($U_V$) from the power drawn from the bus system. As the controlling means, a micro-controller 117 is provided, which is in communication with several memory units in the form of a program memory 118, a RAM 119 and an EEPROM 120. Micro-controller 117 drives a transmitting means 114. Via an antenna 124, radar pulses of the transmitting means are emitted, which are then reflected from a filling product surface (not shown in detail), and are again received in the reverse direction and transformed into electric pulses. The time from the transmission of the radar pulse to the reception of the reflected signal is a dimension figure for the filling level. Micro-controller 117 reads in the signals received from a receiving means 115 through an A/D converter 123, and evaluates same. By means of a process control system (not shown in detail, either) connected through two-wire line 101, micro-controller 117 communicates via a digital communication unit 111, which insofar represents the interface to the outside.

For the inventive control of the power put in by the measuring device 100, the supply voltage, i.e. the voltage applied to two-wire line 101, is measured by the A/D converter 116 connected in parallel to two-wire line 101. Micro-controller 117 sets the current through a current control unit 122 as a function of the supply voltage so that the input current is slowly adapted corresponding to the actual power demand.

According to the detailed representation as per FIG. 2, the desired value is pre-given to the current control unit 122 by the micro-controller 117 via a control line 1. As an option, the desired value can be derived from a reference diode during the start-up phase. Current control unit 122 levels the current input of measuring device 100 to this predetermined desired value. For this purpose, the instantaneous value is assessed via a current sensing resistor R22, whereupon the current is set according to the difference from the desired value. By means of said current control unit 122, a levelling of rapid current fluctuations is possible. So as to allow measuring device 100 to adapt its power input to the actual power demand, its produced power loss has to be determined. A dimension figure for the power loss can, for example, be determined through the voltage drop at resistor R23. The power loss here is measured by means of A/D converter 116. If the power loss is too high, micro-controller 117 will reduce the desired value for current control unit 122 so as to lower the total current input of the measuring device. Therewith, less power loss is produced and the total power input is adapted to the power demand.

In FIG. 3, another embodiment of the invention is shown. The electronic measuring device 300 as per FIG. 3 serves the purpose of a filling level measurement according to the ultrasonic principle.

Measuring device 300 comprises as before a two-wire terminal 101*a* for being connected to a two-wire line 101 and via same to a field bus system. The communication as well as the energy supply both exclusively use two-wire line 101. A power supply unit 312 thereby gains the necessary supply voltage ($U_V$) from the power drawn from the bus system. As the controlling means, a micro-controller 317 is provided, which is in communication with several memory units in the form of a program memory 318, a RAM 319 and an EEPROM 320. Micro-controller 317 drives an ultrasonic transmitting means 312 when the transmitting voltage measured through an A/D converter 316 has reached a predetermined level. Through a sound transducer 324, ultrasonic pulses of transmitting means 314 are emitted, which are then reflected from a filling product surface (not shown in detail), and are received again in the reverse direction and transformed into electric pulses. The time from the transmission of the sonic pulse to the reception of the reflected signal is a dimension figure for the filling level. Micro-controller 317 reads in the signals received from a receiving means 315 through an A/D converter 323, and evaluates same. By means of a process control system (not shown in detail, either) connected through two-wire line 101, micro-controller 317 communicates via a digital communication unit 311, which insofar represents the interface to the outside. To said ultrasonic transmitting means 314, a buffer capacitor 321 is connected, making available the energy necessary for exciting ultrasonic transmitting means 314. A current limiting means 313 is present between buffer capacitor 321 and power supply unit 312.

For the inventive control of the power put in by the measuring device 300, the supply voltage, i.e. the voltage applied to two-wire line 101, is measured by the A/D converter 316 connected in parallel to two-wire line 101. Micro-controller 317 sets the current through a current control unit 322 so that the power input is approximately kept constant or is slowly adapted to the actual power demand, or that the current remains substantially constant with an abruptly changing power demand, and is then slowly reduced or increased depending on whether a lower or higher power demand is given.

Current limiting means 313 provides for a constant charging current in buffer capacitor or transmitting capacitor 312. Current limiting means 322 can here be set through current control unit 322 via a control line 2 to an arbitrary value, yet, it is also imaginable to set current limiting means 313 to a fixed value, hence not to subject it to a control. When transmitting capacitor 321 is being charged and transmitting means 314 is not active, then the input power lowers in toto. So that the current input remains constant in spite of that, the current control unit 322 on the input side can either transform the differential current into heat, or a short excitement of transmitting means 314 can ensue without deriving a measurement therefrom. This takes place when micro-controller 317 recognizes that the transmitting voltage applied to transmitting capacitor 321 has reached a critical level as of which current limiting means 313 can no longer maintain the current through transmitting capacitor 321. The thereby initiated short discharge phase is sufficient for subsequently charging transmitting capacitor 321 again with constant current. The supply voltage of the measuring device 300 is measured with A/D converter 316. The micro-controller adjusts the measuring device current through current control unit 322 depending on the required power input and the input voltage.

The current control is shown in detail in FIG. 4. The desired value is pre-given to said current control by the processor via a control line 1. As an option, the desired value can be derived from a reference diode during the start-up phase. Through this desired value, the total current input of measuring device 300 is controlled. For this purpose, an actual value is sensed through a current sensing resistor R42, and the current source is set according to the deviation from the desired value. This serves for a rapid levelling of current fluctuations. The current flowing out through the current source in turn is sensed by a resistor R43 and serves as an instantaneous value for controlling the charging current limitation shown in more detail in FIG. 5. This control has two different time constants. With the instantaneous value being higher than the desired value, a relatively high time constant becomes effective, and with an instantaneous value being lower than the desired value, a lower time constant becomes effective, which means that the control responds faster to this condition.

The different time constants can, for example, be realized by a circuit according to FIG. 5. An increase of the instantaneous value causes a diode D53 to block so that only resistor R54 is decisive for the time constant of the control. When the instantaneous value lowers, diode D53 becomes conductive. Therewith, the parallel connection of resistors R55 and R54 becomes active, resulting in a lower time constant and hence in the control being faster in responding.

In FIG. 6, the temporal development of the power loss through the shunt arm of current control 322 and the voltage development at the buffer capacitor for the transmitting voltage is shown. The power loss corresponds to the total current minus the sensor current. The sensor current corresponds mostly to the charging current for the buffer capacitor. The basis for the control is that a little current is flowing through the shunt arm of the current control at all times. This is designated as desired value in the diagrams. When the buffer capacitor is charged before a new transmitting operation can be started, then the charging current decreases and the current through the shunt arm increases, see FIG. 6.1. In FIG. 6.2 the associated voltage development at the buffer capacitor is shown. The control for the charging current should not be influenced following the high time constant for this kind of deviation by the increase of the shunt current, which represents a positive deviation from the desired value. The micro-controller recognizes that a power loss is taking place and lowers the total current input by reducing the desired value for current control unit 332. There are two possibilities for recognizing that a power loss is taking place in this configuration. It is recognized either through the temporal development of the transmitting voltage, or through the frequency of occurring transmitting means excitement without deriving a measurement therefrom. Since buffer capacitor 321 is still being charged with the same current, the current path through the shunt arm decreases as compared to FIG. 6.1 and drops below the desired value, see FIG. 6.3. When this is the case, the control for the charging current now comes into action and reduces the level of the charging current. Thereby, the charging duration for the capacitor becomes longer, and the current development and voltage development such as it is illustrated in FIGS. 6.4 and 6.5 will arise. The shunt current will gradually come closer to its desired value, and the voltage at the transmitting capacitor will gradually come closer to the development of a delta voltage. The optimum condition is then given when the current limiting means 313 has just set so that no power loss is generated between the measurements.

The electronic measuring device according to the embodiment shown in FIG. 7 differs from that shown in FIG. 3 and the above-described variation in that current control unit 722 has no control line to current limiting means 713. This lacking control line between current limiting means 713 and current control unit 722 is here being replaced by a control line (here control line 2) from the micro-controller. Current control unit 722, on the contrary, has a measuring line to the A/D converter (measuring line 1). According to the detailed representation as per FIG. 8, the desired value is pre-given to current control unit 722 by the micro-controller via a control line (control line 1). As an option, the desired value can be derived from a reference diode during the start-up phase. The current control unit levels the current input of the measuring device to the pre-given desired value. By means of this current control unit, a levelling of rapid current fluctuations becomes possible. So as to allow the measuring device to adapt its power input to the actual power demand, its power loss produced has to be determined. The power loss produced is determined through the voltage drop at shunt arm resistor R83. Said voltage drop is measured by means of measuring line 1 and A/D converter 716. At too high a power loss, micro-controller 717 will reduce the desired value for the current control unit and will hence lower the total current input of the measuring device. The control process corresponds to that of the aforementioned variation with the exception of the fact that the hardware-contingent control of current limiting means 713 is now being adopted by micro-controller 717 in a software-contingent manner. The desired value for current limiting means 713 is pre-given by micro-controller 717 via control line 2. The current limiting means will start with a low desired value and will be gradually increased until the ideal condition has arisen, namely that no power loss is generated between the actual measurements.

The electronic measuring device 900 according to the embodiment shown in FIG. 9 differs from that shown in FIG. 5 and the afore-described variation in that current control unit 922 has neither a measuring line nor a control line. Should a circuit member downstream of current control unit 922 draw too much current, the current will be reduced by current control unit 922 for a short period of time so that the input current as a whole remains approximately constant. Seen over a longer period of time, the desired value for current control unit 922 is later drawn through the feedback. In case of a current rise in the remaining circuit elements, this will mean a long-term increase of the input current. Micro-controller 917 determines—as in the embodiment as per FIG. 3—the power loss, and drives in each case depending on the demand, current limiting means 413 which is adjustable here, and namely through control line 430. As for the rest, the further components of said measuring device 900 are referenced alike the corresponding components as per FIG. 3, however increased by the value of 800.

Current control unit 922 contains two cascade control circuits. The second control (control 2) provides for the total current remaining constant as in the previous configurations. So as to allow the control means to correctly compensate the fluctuations of the useful current, a certain current has to flow via the shunt arm through resistor R103 at all times. The control means compares its desired value with the instantaneous value of the total current determined through the voltage drop across resistor R102, and adjusts the current source in the shunt arm according to the difference in the currents. The output of control means 1 furnishes the desired value for control means 2. Control means 1 is responsible for ensuring that a little current flows at all times across the shunt arm. Control means 1 gets its desired value e.g. through a reference diode (D101), and compares this value with the instantaneous value, which, for example, can be determined through the voltage drop at resistor R103. The interleaved control unit provides for the total current being adapted to the sensor current, whereby attention is paid to the fact that the loss current is kept at a minimum in the shunt arm.

The present invention is not restricted in its realization to the embodiments given above as being merely preferred. On the contrary, modifications thereof are likewise imaginable, which, in spite of other configuration, fall into the scope of protection of the present invention. The invention is in particular not restricted to electronic measuring devices used within the framework of an ultrasonic filling level measuring device. In the specific case of a filling level measuring device, instead of an ultrasonic sensor unit, another sensor unit working on another suitable measurement principle—such as a radar sensor unit, a sensor unit working on the guided microwave principle—can likewise be used. It is still to be noted that in the shown embodiments, the current control is arranged between the two-wire terminal and the digital communication unit. Of course, it is also possible to provide the communication unit between the two-wire terminal and the current control unit.

The invention claimed is:

1. An electronic measuring device for detecting a process variable connectable to a two-wire line for providing the supply energy and for digital communication with a process control, comprising:

a two-wire terminal, a sensor to measure the process variable, a controlling device for controlling components of the sensor, a voltage measuring device for measuring supply voltage applied through the two-wire line, and a current control unit to supply input current for the electronic measuring device that can be appropriately set as a function of the supply voltage measured by the voltage measuring device, so that the input current is adapted corresponding to the actual power demand during a time that is not detrimental to the communication, wherein the sensor is configured to use one of ultrasonic pulses, radar pulses, and a guided microwave signal to determine a distance from a filling product surface of a filling product present in a receptacle.

2. The electronic measuring device of claim 1, further comprising a device for determining an instantaneous power loss, wherein the controlling device connected with said device for determining an instantaneous power loss and a predetermining variable desired value for the current control unit sets as a function of the determined power loss.

3. The electronic measuring device of claim 1, wherein the current control unit receives a pre-given maximum value for the input current.

4. The electronic measuring device of claim 2, wherein the device for determining the instantaneous power loss is connected with a capacitor so as to measure the temporal development of the voltage at the capacitor and thereby the power loss.

5. The electronic measuring device of claim 2, wherein the device for determining the instantaneous power loss includes a micro-controller, an A/D converter connected with said micro-controller, and a capacitor connected upstream of an ultrasonic transmitter for storing energy for the sensor.

6. The electronic measuring device of claim 1, further comprising a device to determine the frequency of occurrence of sensor excitements without performing a measurement.

7. The electronic measuring device of claim 1, further comprising a current limiter connected with the current control unit.

8. The electronic measuring device of claim 1, wherein the sensor is adapted to dissipate a power loss due to a power demand excess is dissipated by a controlled output of a pulse.

9. The electronic measuring device of claim 1, wherein a power loss due to a power demand excess is transformed into heat.

10. The electronic measuring device of claim 1, wherein a power loss due to a power demand excess is determined through a current sensing resistor within the current control unit.

11. An electronic measuring device for detecting a process variable connectable to a two-wire line for providing the supply energy and for digital communication with a process control, comprising:

a two-wire terminal, a sensor to measure the process variable, a controlling device for controlling components of the sensor, and a current control unit to set current drawn through the two-wire line terminal as a function of the current drawn by the sensor so that the current is adapted corresponding to actual power demand and is not detrimental to the communication, wherein the sensor is configured to use one of ultrasonic pulses, radar pulses, and a guided microwave signal to determine a distance from a filling product surface of a filling product present in a receptacle.

12. The electronic measuring device of claim 11, wherein the current control unit includes two controls, one keeping the total current constant, and one providing for the fact that a little current is flowing through a shunt arm at all times.

13. The electronic measuring device of claim 11, wherein the current control device includes a device for determining an instantaneous power loss, and the controlling device connected with said device for determining an instantaneous power loss and the current control unit predetermining a variable desired value as a function of the determined power loss.

14. The electronic measuring device of claim 13, wherein the device for determining an instantaneous power loss is connected with a capacitor so as to measure the temporal development of the voltage at the capacitor and thereby the power loss.

15. The electronic measuring device of claim 13, wherein the device for determining an instantaneous power loss includes a micro-controller, an A/D converter connected with said micro-controller, and a capacitor connected upstream of an ultrasonic transmitter for storing energy for the sensor.

16. The electronic measuring device of claim 11, wherein a device is present by means of which the frequency of occurrence of sensor excitements can be determined without performing a measurement.

17. The electronic measuring device of claim 11, further comprising a current limiter connected with the current control unit.

18. The electronic measuring device of claim 11, wherein the sensor is adapted to dissipate a power loss due to a power demand excess is dissipated by a controlled output of a pulse.

19. The electronic measuring device of claim 11, wherein a power loss due to a power demand excess is transformed into heat.

20. The electronic measuring device of claim 11, wherein a power loss due to a power demand excess is determined through a current sensing resistor within the current control unit.

21. A method for operating an electronic measuring device for detecting a process variable connectable to a two-wire line for providing the supply energy and for digital communication with a process control, comprising:

measuring the supply voltage applied through the two-wire line; and modifying current to the measuring device in a temporally appropriate manner as a function of the measured supply voltage so that the current is adapted corresponding to the actual power demand while allowing digital communication, wherein said method is realized in the measuring device including a sensor means, in which a distance from a filling product surface of a filling product present in a receptacle is determined by means of one of ultrasonic pulses, radar pulses, and a guided microwave signal.

22. The method of claim 21, wherein the voltage drop is measured at a resistor for determining an instantaneous power loss.

23. The method of claim 21, wherein the power loss instantaneously generated in the measuring device is determined for determining an appropriate power input.

24. A method for operating an electronic measuring device for detecting a process variable connectable to a two-wire line for providing the supply energy and for digital communication with a process control, comprising:

determining current drawn by a sensor, the sensor including a sensor means, in which a distance from a filling product surface of a filling product present in a receptacle is determined by means of one of ultrasonic pulses, radar pulses, and a guided microwave signal; and adapting total current drawn through the two-wire line by the measuring device to the determined sensor current using a current control unit such that the drawn total current is adapted corresponding to the actual power demand within a space of time not detrimental to communication.

25. The method of claim 24, wherein a loss current in a shunt arm is kept at a minimum.

26. The method of claim 24, wherein the power loss instantaneously generated in the measuring device is determined for determining an appropriate power input.

27. The method of claim 26, wherein the temporal development of the voltage at a capacitor connected upstream of the sensor means for measuring the process variable is measured for determining the instantaneous power loss.

28. The method of claim 26, wherein the frequency of occurrence of sensor excitements is determined without performing a measurement.

29. A two-wire line, electronic measuring device for detecting a process variable, comprising:

a two-wire terminal;

a sensor operably connected to the two wire terminal and adapted to detect the process variable;

a voltage measuring device operably connected to the two-wire terminal and adapted to measure a supply voltage; and a current control unit operably connected to the two-wire terminal, the current control unit being adapted to supply current as a function of the supply voltage measured by the voltage measuring device such that the input current meets power demand and allows digital communication, wherein the sensor is configured to use one of ultrasonic pulses, radar pulses, and a guided microwave signal to determine a distance from a filling product surface of a filling product present in a receptacle.

* * * * *